Aug. 18, 1964
D. H. IMHOFF
3,145,149
BOILING NUCLEAR REACTOR AND FUEL ELEMENT THEREFOR
Filed Nov. 4, 1958
3 Sheets-Sheet 1
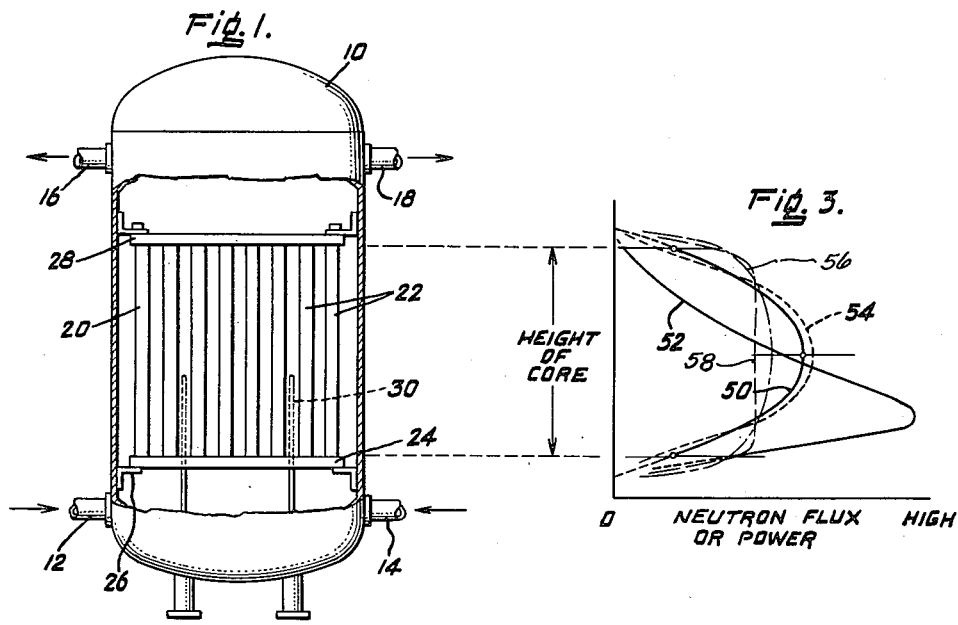
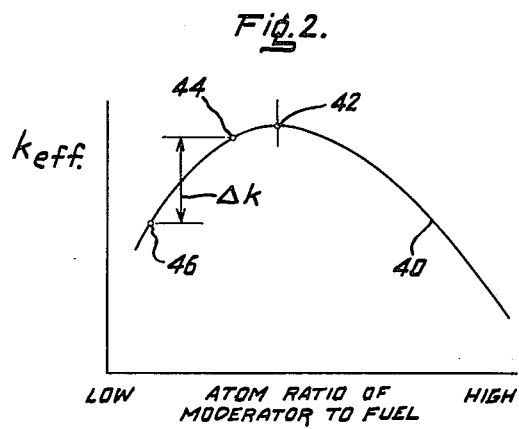
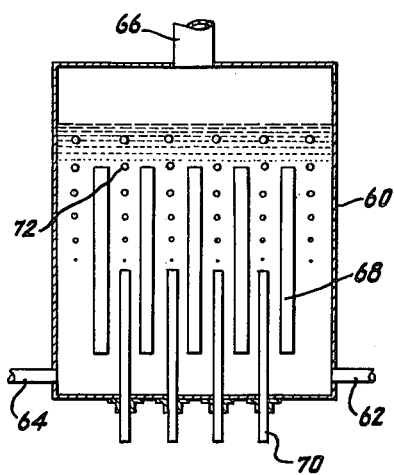
INVENTOR.
DONALD H. IMHOFF
BY
ATTORNEY.

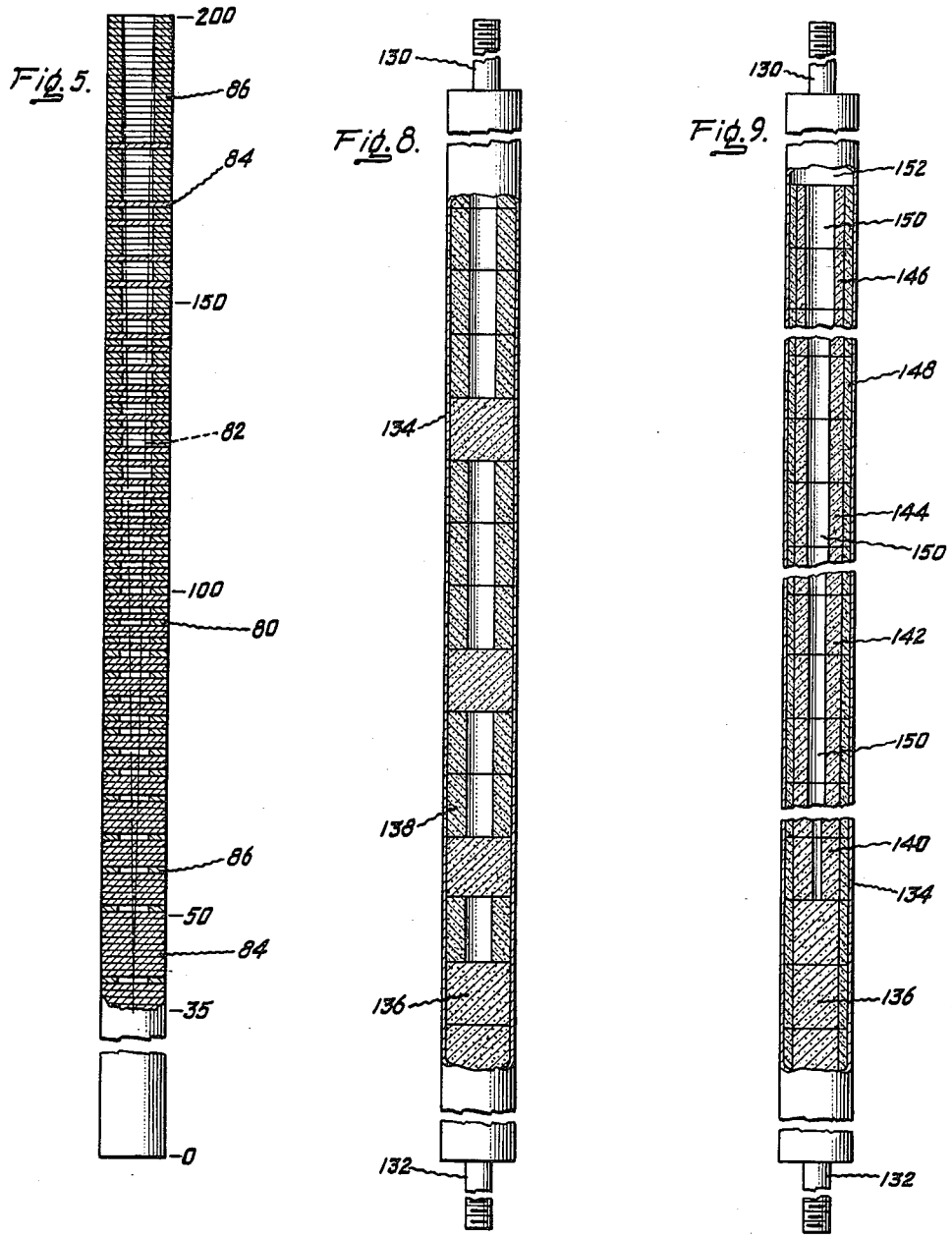

INVENTOR.
DONALD H. IMHOFF,
BY
ATTORNEY.

United States Patent Office 3,145,149
Patented Aug. 18, 1964

3,145,149
BOILING NUCLEAR REACTOR AND FUEL ELEMENT THEREFOR
Donald H. Imhoff, Los Gatos, Calif., assignor to General Electric Company, a corporation of New York
Filed Nov. 4, 1958, Ser. No. 771,861
14 Claims. (Cl. 176—54)

This invention relates generally to the liberation of energy in nuclear reactors, and particularly in power reactors, and it relates more specifically to an improved boiling reactor and a unique fuel element and reactor core therefore which permits neutron flux and power generation rate normalization or "flattening" in the reactor core.

The release of large amounts of energy through nuclear fission reactions is now quite well known. In general, a fissionable atom such as $U^{233}$, $U^{235}$, or $Pu^{239}$ absorbs a thermal neutron in its nucleus and undergoes a nuclear disintegration. This produces, on the average, two fission products of lower atomic weight and great kinetic energy, and several high energy neutrons. For example, the fission of a single atom of $U^{235}$ produces a light fission product and a heavy fission product with mass numbers ranging between 80 and 110 and between 125 and 155 respectively and an average of 2.5 neutrons. The energy release approaches about 200 mev. (million electron volts) per fission.

The kinetic energy of the neutrons and fission products is quickly dissipated, primarily in the nuclear fuel, as heat. If after this heat generation there is at least one net neutron remaining which induces a subsequent fission, the fission reaction becomes self-sustaining and the heat generation is continuous. The heat is removed by recirculating a coolant through heat exchange relationship with the nuclear fuel and a heat sink. The reaction may be continued as long as sufficient fissionable material remains in the system to override the effects of the fission products which also may be present.

In order to maintain such fission reactions at a rate sufficient to generate useful quantities of thermal energy, nuclear reactors are presently being designed, constructed, and operated in which the nuclear fuel is contained in fuel elements which may have various shapes, including plates, tubes, or rods. These fuel elements are usually provided with a corrosion resistant heat conductive cladding on their external surfaces, and are grouped together at fixed distances from each other in a coolant flow channel or region as a fuel assembly. A sufficient number of fuel assemblies are so combined in an array or lattice to form the nuclear reactor core capable of the self-sustained fission reaction referred to above. The core is enclosed within a reactor vessel through which a coolant is circulated.

In some nuclear power reactors, a solid neutron moderator is employed and it is present in a fixed ratio and distribution with respect to the nuclear fuel. A fluid coolant is passed through heat exchange relation with the moderator and the fuel to remove the liberated heat. In such a reactor there is only a slight variation in the moderator to fuel atom ratio as a function of temperature. In other types of nuclear power reactors a liquid moderator, which may also serve as a coolant, is used. Such liquid moderators include heavy water, or $D_2O$, light water, or $H_2O$, or mixtures of these materials, or organic fluids such as terphenyl or the like which are stable at moderately elevated temperatures. In a liquid moderated reactor, the temperature effects on the moderator to fuel atom ratio are relatively large due to the fluid density variation with temperature.

In some types of liquid moderated reactors, the liquid moderator is boiled and functions also as the coolant. The heat removed from the reactor is carried as sensible heat in the moderator vapor. In the reactor core where the moderator is boiled, the formation of vapor voids exerts a very great effect on the moderator to fuel atom ratio due to the large density change occurring on vaporization. There is also a large variation in the effective reactivity $k_{eff}$ of the core. With a relatively low moderator to fuel ratio, void formation decreases $k_{eff}$ and accordingly the reactor is said to have a negative reactivity coefficient and be self-regulating or fail-safe. The negative coefficient of reactivity with change in the moderator to fuel ratio limits the amount of power which can be generated in the reactor core. Further, since the coolant flow is in one direction, the voids which form tend to be concentrated toward the coolant outlet end of the core. Since the moderator to fuel ratio thus is non-uniform along the coolant flow path, the axial neutron flux and power generation are also extremely non-uniform and are said to be "warped" from the normal cosine distribution. This warped distribution of power generation leads directly to a widely variant temperature distribution along the coolant flow path, the amount of power available from the reactor being limited by the temperature at the hottest part of the fuel element.

Attempts to overcome this warped power distribution have included the insertion of control rod poison into the core at the opposite end from that where the vapor voids are concentrated and a substantial degree of flux and power normalization or flattening can be obtained. However, there are two principle disadvantages to this system. First, the introduction of control poison inherently is wasteful of neutrons since the degree of non-fission capture is directly proportional to the amount of poison present. Second, the life of the core load of fuel, or the fuel burn-up, which may be expected is considerably decreased due to the fact that it is not possible to burn out all of the original excess reactivity built into the clean core when some of the control poison must necessarily be present in the core even at the end of life to maintain the flux and power flattening.

It is accordingly a primary object of the present invention to overcome, in a boiling reactor system, the aforementioned problems concerned with warped flux and power distributions and shortened burn-up resulting from the use of control poison for flux and power flattening.

An additional object is to provide a new and improved nuclear reactor fuel element which is particularly well suited for use in power and other reactors in which a neutron-moderating coolant liquid is boiled, and which imparts to a boiling reactor core considerably flatter neutron flux and power distributions, even under boiling conditions, than heretofore possible.

It is a specific object of this invention to provide a nuclear fuel element for use in reactors cooled by boiling a neutron-moderating coolant therein, in which the effective concentration of fissile material in the fuel is non-uniform along the length of the fuel element to provide axial neutron flux and power distributions which are substantially normal (cosine) or flatter than normal (pseudo square wave) and which permit reactor operation and fuel burn-up to continue at normal power level to a point at which the control poison is completely withdrawn from the core.

It is also an object of this invention to provide an improved nuclear reactor having a core composed of the above-mentioned fuel elements and in which the substantially improved axial neutron flux and power variations are realized even in the presence of a boiling neutron-moderated coolant.

Other objects and advantages of this invention will occur to those skilled in the art as the description and illustration thereof proceed.

Briefly, the present invention comprises a nuclear reactor fuel element, and a nuclear reactor having a core made up of generally elongated fuel elements in which the average total quantity of fissile and fertile material (fuel) per unit length of fuel element decreases with distance along the fuel element in the direction of the flow of moderating coolant through the reactor core. The fuel element and the reactor core of this invention are also provided with a substantially uniform quantity of fissile material per unit length of the fuel element. In this way the effective or average enrichment or fissile atom concentration in the fuel element increases in the fuel element in the coolant flow direction. The abnormal variations in neutron flux and power generation with distance through the reactor core, ordinarily caused by boiling the moderator in the presence of conventional fuel, are entirely overcome. The reactor core of this invention, when boiling of the moderator occurs in the coolant channels, has either a substantially uniform or a predetermined non-uniform local $k_{eff}$ along the length of the coolant flow path and therefore has either a corresponding substantially normal (cosine) or flatter than normal (pseudo square wave) neutron flux and power generation distributions.

The present invention will be best described in detail and understood by reference to the accompanying drawings in which:

FIGURE 1 is a schematic elevation view in partial cross-section of a nuclear reactor vessel containing a core made up of vertical fuel elements through which a liquid neutron-moderating coolant may be passed;

FIGURE 2 is a graphic representation of the variation of $k_{eff}$ for a liquid moderated reactor core with change in the moderator to fuel atom ratio;

FIGURE 3 is a graphic representation of the neutron flux or power generation showing the variation of these parameters as a function of operating condition and fuel type with distance through the reactor core illustrated in FIGURE 1;

FIGURE 4 is a schematic elevation view in cross-section of a reactor having a boiling neutron-moderating coolant and showing the insertion of control poison adjacent the coolant inlet end of the core;

FIGURE 5 is an elevation view in cross-section of a fuel element embodying the present invention;

FIGURE 8 is an elevation view in partial cross-section showing one embodiment of the present invention in a fuel element; and FIGURE 9 is a corresponding view of a second embodiment of the invention.

Figure 6:
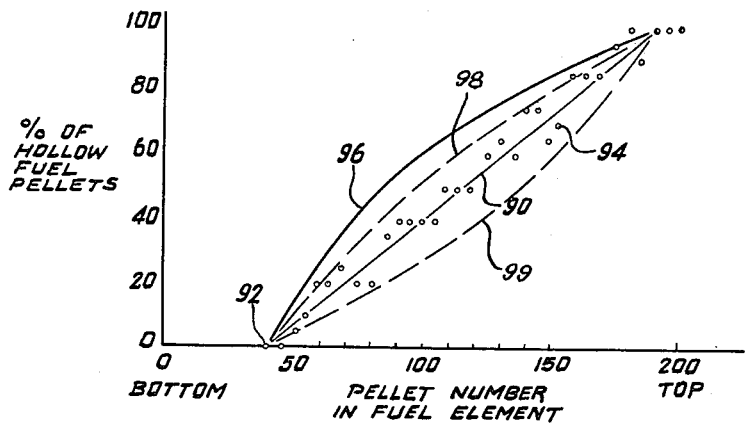
FIGURE 6 is a graphic representation of a typical distribution of hollow fuel pellets of relatively high enrichment and solid fuel pellets of relatively low enrichment along the length of the fuel element of this invention.

Referring now more particularly to FIGURE 1, reactor vessel 10 is provided with coolant inlets 12 and 14 and coolant outlets 16 and 18. Disposed vertically between these connections is reactor core 20 made up of a plurality of vertically disposed fuel assemblies or flow channels 22, each containing one or more nuclear fuel elements, not shown, but conventionally in the form of plates, rods, or tubes as is well known. The reactor core rests on a lower support grid 24 which in turn is supported by means of brackets 26 from the reactor wall. The holddown grid or member 28 is provided at the top of the core to prevent relative movement between the fuel channels. Control rods 30 are inserted into the core in the conventional manner to control the rate of heat liberation. These control rods are actuated by means not shown, but which are conventional.

The flow of neutron moderating coolant through this reactor is upwardly through the core and if the operating pressure is maintained sufficiently high relative to the coolant temperature, no boiling of the moderator will result. This type of operation is typical of the so-called pressurized water reactors. Downward coolant flow can be employed if desired. If the operating pressure is relatively low, the moderating coolant may be boiled in which case coolant upflow is used and moderator vapor is discharged from outlets 16 and 18. This is typical of so-called boiling water reactors.

In FIGURE 2, curve 40 shows the variation of $k_{eff}$ of reactor core 20 as a function of the atom ratio of moderator to fuel at constant fuel enrichment. The moderator density in the core decreases with increases in temperature and the formation of vapor voids. A maximum at point 42 is shown. At any point to the right of point 42, decreases in the moderator to fuel ratio cause increases in $k_{eff}$. Such reactor cores are not self-regulating, but have a positive reactivity coefficient. At any point to the left of point 42, the reactivity coefficient is negative in that $k_{eff}$ decreases with decreases in moderator to fuel ratio. Due to the fact that it is undesirable from a safety standpoint to have a reactor core with an over-all positive reactivity coefficient at any time from start-up to operating condition, liquid moderated reactors are nearly always designed to the left of point 42 to make them fail-safe.

Typically, point 42 represents the condition of such a liquid moderated reactor under clean cold conditions. During start-up, the temperature of the system rises, the average temperature of the moderator present in the reactor increases, its density decreases, and the moderator to fuel ratio decreases. This continues until the moderator temperature reaches saturation, but without boiling, the reactor condition is represented by point 44. Further increases in power generation cause vapor voids to form in the moderator. This further reduces the moderator to fuel ratio to an extent which is greatest adjacent the coolant outlet of the core since the void fraction is largest at this point. The condition at this point is represented by point 46 on curve 40. The maximum loss in $k_{eff}$ in a boiling reactor core is represented by the vertical distance $\Delta k$ between points 44 and 46, and thus it is seen that attempts to liberate heat at high rates by boiling the moderator are effective, but at the expense of a large reduction in $k_{eff}$ which in turn limits the maximum power level of the system.

In FIGURE 3, graphic representations of the variations of the axial neutron flux or power generation along the length of the fuel elements are shown for various operating conditions and fuel types in the reactor of FIGURE 1. Curve 50 represents the normal cosine flux and power distribution along the core which is characteristic of constant $k_{eff}$ and constant enrichment throughout the core. Such a distribution is rarely, if ever, fully realized due to the aforementioned temperature changes which alter the effective moderator to fuel ratio. Curve 50 may be determined experimentally, or derived through a solution of the steady state neutron diffusion equation $$D \nabla^2 \phi_i - \Sigma_R \phi_i + S = 0$$

in which the S term represents the source of neutrons, $\Sigma_R \phi_i$ represents the removal of neutrons by slowing down, absorption, etc., and $D \nabla^2 \phi_i$ is a leakage term. The equation is solved for a plurality of neutron energy groups, such as $\phi_1$, $\phi_2$, $\phi_3$, etc., corresponding to fast, intermediate, and thermal energies. The thermal neutron flux variation along the axis at the core is a substantially cosine curve and the corresponding peak to average power ratio is about 1.7. The value is most nearly met in non-boiling liquid-moderated reactors operating at low temperature rises where the variations in $k_{eff}$ is small.

However, when the neutron moderator is boiled and $k_{eff}$ at any given point in the reactor lies between points 42 and 64 in FIGURE 2, a warped neutron flux and power distribution results which is also directly determinable through the solution of the diffusion equation substituting the variable $k_{eff}$ taken from the curve in FIGURE 2. This warped distribution is shown at 52 in FIGURE 3, the peak to average power ratio here is about 3.5, and accordingly, the peak to average fuel temperature is correspondingly high. Since the strength of the fuel and structural materials under high temperature conditions is limited, the maximum power generation of the reactor core is limited by the peak temperature existing in only one part of the length of the core.

The above-mentioned procedures to normalize the flux and power distribution, by control rod insertion from the coolant inlet end of the core, are effective and can return the axial flux and power distribution to that represented approximately by curve 54 in FIGURE 3. This procedure, however, suffers from the disadvantages previously mentioned in respect toth e inefficiency in neutron utilization and a decreased permissible fuel burnup. The utilization of the improved nuclear reactor fuel according to this invention results in the flattened distributions illustrated by curves 56 and 58 in which the peak to average power ratio is less than 1.7 and approaches 1.0 corresponding to a square wave rather than a cosine curve.

In FIGURE 4, a schematic representation of the partially vaporized condition of a boiling moderator coolant in a reactor is shown. Here reactor enclosure 60 is provided with coolant inlets 62 and 64 and a vapor outlet 66. Fuel elements 68 are arranged in a lattice or core and control rods 70 are inserted from the coolant inlet end. Vapor voids 72 form and enlarge as they move upwardly with the coolant between the fuel elements, effectively reducing the moderator to fuel atom ratio and the local value of $k_{eff}$ in the upper or boiling region of the core. This is reflected in the reduced flux and power shown in FIGURE 3 in the region in curve 52 corresponding to the upper part of the core. At a total core power level corresponding to normal curve 50 in FIGURE 3, the lower part of the boiling core must generate the power equivalent to that lost or unavailable in the upper part of the core. This is responsible for the lower peak in the lower region of curve 52 in FIGURE 3, in the absence of control rods 70. An insertion of the control rods as shown in FIGURE 4 absorbs sufficient neutrons to reduce the neutron flux and the power generation in the lower part of the core returning the approximate cosine distribution shown as curve 54 shown in FIGURE 3. The nuclear fuel herein described further improves the flux and power distributions to those corresponding to curves 56 and 58 in FIGURE 3.

In FIGURE 5 is shown a fuel element embodying the present invention. In this figure, the relative vertical dimension is foreshortened. By way of example, this fuel elements is about 110 inches long, about 0.6 inch in diameter, and contains 200 axially aligned fuel pellets about 0.5 inch long. The coolant flow direction is assumed to be upward and the boiling boundary is assumed to exist in the vicinity of the 35th pellet from the bottom or coolant inlet end. If saturated coolant is introduced to the reactor, as it may be in a single cycle boiler, the boiling boundary will exist in the vicinity of the first fuel pellet. In any event, beginning at the boiling boundary and extending in the direction of the coolant outlet at the 200th pellet, the average total weight of fuel per unit length decreases according to this invention with distance along the fuel element in the coolant flow direction as though an internal downwardly tapering void or opening 82 were contained in fuel rod 80 and extending from the coolant outlet end of the fuel element and ending at a point in the vicinity of the boiling boundary. The average fissile atom content per unit length is held substantially constant according to this invention. Thus, the average fissile atom concentration is higher adjacent the outlet end of the core in order to produce a substanially constant $k_{eff}$ throughout the boiling region above the 35th pellet and which is substantially equal to the $k_{eff}$ in the non-boiling region below the 35th pellet.

In the embodiment of present invention shown in FIGURE 5, these variations in average fuel weight and fissile atom concentration along the fuel element length are effected by providing a mixture of solid fuel pellets 84 and hollow fuel pellets 86 approximately in the distribution shown. Any desired average or effective variation in fissile atom concentration and fuel weight may be effected along the length of the fuel elements using only the solid fuel pellets containing a certain number of fissile atoms and hollow fuel pellets containing an equivalent number of fissile atoms but which have smaller weights and fuel contents due to the inner void space. The fuel pellets adjacent the coolant inlet end of the fuel element are all solid if the coolant is introduced below the boiling point. Beginning at the boiling boundary, which may be at the coolant inlet end of the core if saturated coolant is introduced, and continuing in the coolant flow direction toward the coolant outlet end of the fuel rod, the average number of solid pellets in any length increment decreases and the average number of hollow pellets simultaneously increases in a predetermined variation to maintain the desired $k_{eff}$ and provide thus a normal or a flattened flux and power distribution through the boiling region even in the presence of vaporized moderator voids. As previously indicated with a constant $k_{eff}$, the axial neutron flux and power generation variation along the length of the conventional fuel element is normal and corresponds to "cosine" curve 50 in FIGURE 3 with a peak to average ratio of about 1.7. The terms "flat" and "flattened" refer to flux or power lever variations approaching the shape of a square wave, that is, one in which the peak to average value is 1.0. With the fuel element of this invention, such flattened flux and power variations are realized in spite of boiling effects by maintaining the desired equivalent $k_{eff}$ variation along the length of the core to compensate the normal cosine variation to a flattened or "square wave" variation.

It should be pointed out that in FIGURE 5, the relative scale in the vertical and horizontal directions is such that the individual fuel 0.5 inch by 0.5 inch pellets appear as wafers. The vertical scale is foreshortened to illustrate in FIGURE 5 approximately 200 fuel pellets which is characteristic of a fuel element on the order of 9 feet long and including fuel pellets approximately 0.5 inch in each dimension.

Referring now particularly to FIGURE 6, a graphic representation of the variation in the percentage of hollow pellets in the fuel rod with distance toward the coolant outlet from the boiling boundary is shown. A linear curve 90 is drawn from the boiling boundary, represented by point 92, to the coolant outlet end of the fuel element. Points 94 represent the percentage of hollow fuel pellets in each successive overlapping group of 10 fuel pellets in the fuel element shown in FIGURE 5. For example, the first three groups include pellets numbered 35–44, 40–49, 45–54, and so on. The linearity of this variation in hollow fuel pellet concentration is chosen here for purposes of illustration. Actually, the variation in percentage of hollow pellets will not always be linear, but will have a curvature of the type indicated by curve 96 in which the hollow pellet concentration rises faster with distance just above the boiling boundary than it does at the coolant outlet end of the core. This curvature is required to maintain a constant $k_{eff}$ in the presence of boiling due to the non-linearity of the variation of $k_{eff}$ with changes in moderator to fuel ratio (curve 40 between points 44 and 46 in FIGURE 2), the difference between the velocities of the vapor and the liquid phases ("slip"), and the increase in velocity of moderator void vapor with distance through the boiling region of the core, the variation in power generation rate with distance along the fuel element (curve 50 in FIGURE 3), etc. With such constant $k_{eff}$, normal or cosine flux and power distributions result even in the presence of the boiling coolant. The distribution of the hollow and the void fuel elements is determined in the same manner as the linear illustration, but taking into consideration these non-linear characteristics and the desired flux variation, i.e., whether normal or flatter than normal.

Figure 7:
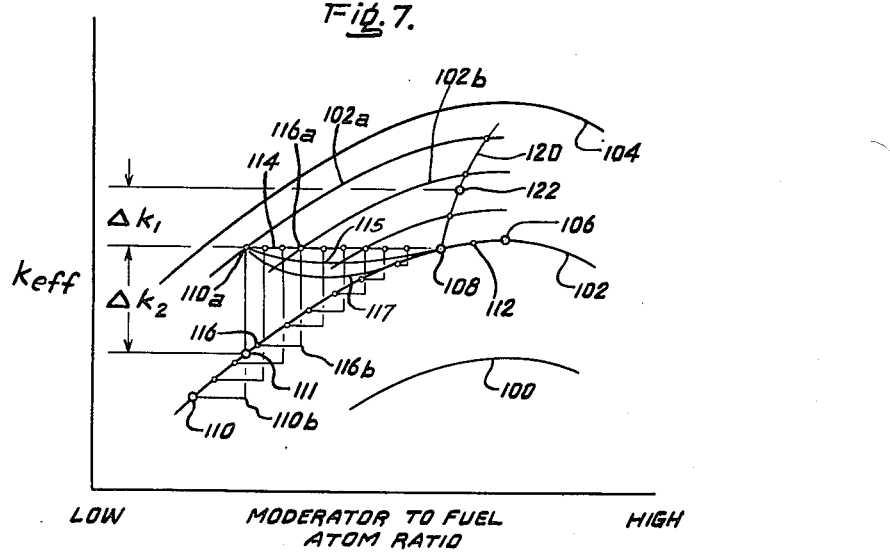
FIGURE 7 is a graphic representation which illustrates the basis on which the improved fuel element according to this invention achieves predetermined $k_{eff}$ and normal and flattened flux and power distributions in the presence of boiling moderator.

In FIGURE 7 is shown a graphical representation of the mechanism believed to be responsible for the realization of controlled $k_{eff}$ and the normal or flattened axial flux and power distributions in utilizing the fuel element of this invention in a nuclear reactor utilizing a boiling moderator coolant. A family of curves 100, 102, and 104 represents increasing enrichments or concentrations of fissile atoms in the fuel. Point 106 corresponds to the clean cold reactor condition, point 108 corresponds to the condition existing in the reactor at the point where moderator vaporization begins, that is at the boiling boundary, in a reactor having conventional fuel, and point 110 corresponds to the usual condition existing at the coolant outlet end of the reactor. Point 112 corresponds to the condition existing at the coolant inlet end of the reactor core when the coolant is introduced at less than the saturation temperature, that is with a degree of subcooling. The various other points shown on curve 102 between points 108 and 110 represent the effective local $k_{eff}$ existing along successive incremental lengths of the fuel element through the boiling region. It is seen that as the vapor voids become larger as the extent of coolant vaporization increases, the $k_{eff}$ at each successive increment becomes lower and lower along the coolant flow path and that a substantial loss in $k_{eff}$ equal to $\Delta k_2$, occurs on boiling with conventional fuel.

In the fuel element of the present invention, it is possible, but not necessary, to provide a smooth variation in fuel weight or content per unit length or a smooth variation in the effective enrichment with length and provide either a constant or any predetermined variation in effective local $k_{eff}$ to attain either a normal or flatter-than-normal axial flux and power distributions. Such smooth variations in fuel content and enrichment may be provided by constructing a fuel rod having the downwardly tapering void space along the longitudinal axis of the rod as indicated at 82 in FIGURE 5. Since each fuel pellet in the series contains the same fissile atom content according to this invention, an infinite number of different kinds of hollow fuel pellets differing in the size of the internal opening is required in this embodiment. In the practice of this invention, this infinite variation is not necessary due to the fact that the neutron migration length at room temperature is relatively high when compared with the average dimensions of an individual fuel pellet. The migration lengths are on the order of 2.53 inches in light water, 2.61 inches in terphenyl, 39.8 inches in heavy water, and are even higher at reactor operating temperatures. The maximum dimension in any direction of the individual fuel pellets employed in the embodiments of the present invention is considerably less than these neutron migration lengths. They are ordinarily less than 25 percent and preferably less than 10 percent of these distances. Thus, the individual neutron cannot "see" local anomalies due to the presence of a solid pellet in a series of hollow pellets, or vice versa. Thus it is the average fissile atom concentration and the average fuel content, over an incremental length of fuel rod which is less than about 20 percent of the local neutron migration length, which is effective in determining the value of $k_{eff}$. Therefore, in the fuel elements of this invention, the predetermined variations in effective enrichment and in effective fuel content are most readily obtained by a linear arrangement of individual fuel pellets including only one kind of solid pellet and one kind of hollow pellet, each containing the same effective fissile atom content, and arranged to form a fuel rod whose average fissile concentration and fuel content vary as described.

Horizontal line 114 in FIGURE 7 represents the constant local $k_{eff}$ values for successive incremental lengths of fuel in spite of changes of moderator density due to boiling and which is realized with the fuel element of this invention. As indicated previously, this fuel element has an increasing effective enrichment, or fissile atom concentration, and a decreasing effective fuel content per unit length of fuel element in the direction of coolant flow from the boiling boundary to the outlet end of the fuel element as illustrated in FIGURES 5 and 6. The points along curve 102, which represent the performance of conventional fuel, are translated to those lying along line 114 at constant $k_{eff}$ by means of a fuel element embodying this invention and which has a hollow and solid pellet distribution corresponding to curve 96 in FIGURE 6, used in a boiling moderator-cooled reactor. In FIGURE 7, point 110 corresponds to point 110a to which it is connected by tie line 110b, and point 110a represents the equivalent $k_{eff}$ of the last 10 fuel pellets (numbers 191–200) in fuel element 80 shown in FIGURE 5. Since all of these are hollow and contain the same equivalent number of fissile atoms as the solid pellets, the moderator to fuel ratio and the fissile atom concentration or enrichment are both increased, thus effectively translating point 110 on curve 102 to point 110a on higher effective enrichment curve 102a and line 114. Similarly, point 116 corresponds to an incremental length of fuel element disposed roughly one-third of the way into the core from the coolant outlet. The average number of hollow fuel pellets in this increment is somewhat less than at point 110a, and the effective enrichment is also somewhat less since the same effective amount of fissile material is contained in an incremental length of fuel element which has a larger average fuel content due to the presence of the solid pellets. Thus, the moderator to fuel ratio is somewhat higher and the effective enrichment is somewhat lower at this point than at point 110a. This effectively translates point 116 to point 116a on enrichment curve 102b and line 114, and to which it is tied by tie line 116b. The remaining points along curve 102, between the boiling boundary represented by point 108 and the outlet end of the reactor represented by point 110, are similarly translated to a series of corresponding points along line 114, giving each incremental portion of the boiling region the same local $k_{eff}$ in the presence of vaporized moderator.

The boiling reactor is thus given a constant, or substantially constant, equivalent value of $k_{eff}$ throughout the boiling region, and hence normal or cosine flux and power variations as represented by curve 50 previously described in FIGURE 3.

In accordance with this invention, a distribution of hollow and solid fuel pellets different from those represented by curves 96 and 90 in FIGURE 6 may be employed, but retaining the same hollow pellet concentrations of 0 percent and 100 percent at the boiling boundary and at the coolant outlet ends, respectively. By decreasing the percentage of hollow fuel pellets in the fuel between these points, as represented, for example, by curves 98 or 99 in FIGURE 6, the equivalent local values of $k_{eff}$ in the central portion of the boiling regions are lowered relative to the values at the boiling boundary and the outlet as indicated by curve 115 or 117 respectively in FIGURE 7. These $k_{eff}$ values in turn correspond to the flattened or pseudo square wave flux and power distributions shown as curves 56 or 58 respectively in FIGURE 3. Thus, peak to average flux and power ratios well below 1.7 and approaching 1.0 are obtained.

When a nuclear reactor including fuel elements according to this invention is shut down, the boiling ceases, the moderator to fuel ratio in each incremental boiling region portion increases and the equivalent local $k_{eff}$ values rise along the various enrichment curves in FIG- URE 7 between curves 102 and 104 to a series of points lying along curve 120 and giving the reactor an over-all $k_{eff}$ represented by point 122. Further subcooling to room temperature increases the moderator to fuel ratio slightly along an average effective enrichment curve passing through point 122. It is readily seen that the loss in reactivity or $\Delta k$, with the improved fuel of the present invention is represented by the vertical distance between point 122 and horizontal line 114. It is clear that this loss in reactivity due to voids is substantially less than the loss in reactivity $\Delta k_2$ corresponding to the vertical distance between points 108 and 111 which is characteristic of the conventional boiling reactors. This is an advantage which is related, of course, to normal or flattened flux and power distributions previously described.

Referring now to FIGURE 8, an embodiment of the present invention is illustrated in which a portion of an actual fuel element is shown embodying this invention approximately to scale. The fuel element is provided with end connectors 130 and 132 and with a tubular cladding 134 of corrosion resistant material such as zirconium, stainless steel, or the like. The fuel rod is made up of a series of longitudinally aligned solid fuel pellets 136 and hollow fuel pellets 138, in an order in which the average number of hollow fuel pellets 138 increases in the upward or coolant flow direction. In FIGURE 8 a succession of adjacent groups of increasing numbers of hollow fuel pellets are shown, each separated by a single solid fuel pellet. It should be noted that only one kind of solid pellet and only one kind of hollow pellet are required in this embodiment.

Referring finally to FIGURE 9, another embodiment of the present invention is shown in which particular parts corresponding to those shown in FIGURE 8 are designated by the same numbers. In this modification a plurality of five different kinds of fuel pellets are required for manufacture; namely solid pellets 136 and four kinds of hollow fuel pellets 140, 142, 144, and 146, each having a successively larger central void opening and correspondingly smaller fuel weight. This approaches the smooth variation of fuel content and fissile atom content per fuel pellet previously discussed. In addition, however, these solid and hollow pellets are all provided with an external layer 148 in which the fissile material is substantially entirely incorporated. For example, the fuel surrounded by layer 148 may be depleted or natural uranium or thorium, while the layer 148 may be plutonium, or enriched uranium. The central void 150 effectively tapers downwardly and gives the average fissile concentration and fuel volume variations required to translate the points on curve 102, in FIGURE 7 between points 108 and 110, upwardly to corresponding points on curve 114 to achieve the constant or predetermined variation of $k_{eff}$.

The modification shown in FIGURE 9 has a substantial advantage over ordinary fuel elements. The central void opening 150 provides a space for the accumulation of any liberated fission gases and in addition end void 152 provides for expansion of the fuel pellets. Normally the central part of the fuel element operates at the highest temperature. In this fuel element the central void prevents the generation of such high temperatures. Further, when the fissile material is concentrated in the outer 0.5 to 20 percent by volume of the pellet immediately adjacent the heat transfer surface, the maximum permissible thermal output from this fuel element is initially as much as 60 times greater than the conventional uniformly enriched refractory fuel pellet, and even after prolonged operation is still about three times greater.

The fuel material which may be used in the fuel elements of this invention includes any of the known fertile or fissionable materials such as uranium, thorium, plutonium, and the like. They may be incorporated in their elemental form, as alloys, as mixtures, or as compounds such as the oxides, silicides, carbides, and the like. The manufacture of fuel elements containing these materials is now quite well known and for the most part follows conventional metallurigical and chemical techniques. With particular reference to the hollow fuel elements, these can be manufactured by conventional punching, machining, casting, or other techniques if they are metallic. In the case of refractory compounds, such as the oxides and carbides, these shapes may be pressed from powders using a die and punch that allows the powder to be poured into the die around a central co-axial mandril. The punch is tubular and a compress is produced with a central hole through it. Sintering the compress follows to produce a hard high-density pellet.

In respect to the fuel pellets in which the fissile material is concentrated adjacent the surface, a special die and punch system may be employed which incorporates a movable sleeve. The inner part is filled with natural unenriched, or depleted fuel or fuel with relatively low enrichment while the outer annulus is filled with the high enrichment material. The sleeve is then removed and the entire mass is compressed to form a pellet which is then sintered. In another modification of this procedure, the sleeve is a heavy walled insert in the die cavity, the inner volume is filled with fertile material and pressed, the insert removed, the remaining open spacing is filled with fertile material and a tubular punch used to press the second charge of powder. This compress is then sintered.

There are other methods of manufacturing the annularly loaded fuel element pellets. For example, a slip casting procedure may be used which consists of forming, either by pressing or extruding, shape of the fertile material, such as $ThO_2$ or $UO_2$, for example. These shapes are then dried and presintered so that they can be handled readily. They are then dipped into a slip or slurry of fissionable material, such as enriched $UO_2$, which then dries as a thin coating on the outside surface of the fertile shape. This material is then sintered at high temperature to produce the final fuel pellet.

Although the description of this invention is restricted principally to the cylindrical and tubular fuel pellets, it should be understood that these are not the only geometric forms to which the present invention is applicable. Fuel pellets of triangular, square, hexagonal, or any other suitable geometric cross-section may be manufactured by the foregoing or other known procedures. Similarly, fuel elements of rectangular cross-section approaching the form of fuel plates may also be formed, the essential requirement according to this invention is the generation of the fissile atom concentration and the fuel atom content of each pellet as a function of distance along the fuel element length in the direction of coolant flow according to principles herein described.

The following data are given by way of specific examples to permit comparison of the performance of a conventional boiling reactor core utilizing uranium dioxide fuel elements in the form of solid rods with the performance, under identical circumstances, of a boiling reactor having fuel elements embodying the principles of the present invention.

*Example I*

A boiling water reactor contains a core having 488 fuel assemblies including an outer flow channel approximately 10 feet long and of square cross-section 3.5 inches along the side. Each channel contains 36 solid uranium dioxide ($UO_2$) fuel elements arranged in a square 6 x 6 array, the rods being spaced 0.71 inch center to center. The enrichment is 1.50 percent by weight $U^{235}$ and the fuel pellets are approximately 0.5 inch long and 0.5 inch in diameter, compressed and sintered to 95 percent of the theoretical $UO_2$ density. The total uranium dioxide fuel in the core amounts to 134,200 pounds, is contained in 17,551 fuel rods, and the assemblies are included in a core fitting into a circumscribed circle 129 inches in diameter. The fuel rod cladding of the fuel assembly channels is Zircaloy-2, the reactor core rating is 626 mw. (t.) (thermal megawatts), and the reactor plant rating is 192 mw. (e.) (electrical megawatts) gross and 180 mw. (e.) net. The moderating coolant is demineralized light water and the average volume ratio of water to $UO_2$ fuel in the core is 2.17. The reactor operates at 1015 p.s.i. The stream of water is introduced into the core at a temperature of 505° F., 40° F. subcooled, and it leaves as a mixture of saturated steam and water at 545° F. The coolant circulation rate is $25.6 \times 10^6$ pounds per hour. At a power level of 626 mw. (t.) with a clean core under boiling conditions with the control rods out, the axial neutron flux and power generation are highly warped with a peak to average value of about 3.5.

*Example II*

At an identical power level of 626 mw. (t.) with the same clean core and under boiling conditions, the peak to average neutron flux and power ratios are reduced to 1.5 through the use of control rod programming with the control rods inserted into the reactor core adjacent the coolant inlet end. The expected life of this core is about 3000 mw. d./t. (megawatt days per ton) due to the use of control rods or flux and power flattening.

*Example III*

An improved reactor core with fuel rods embodying the present invention is operated boiling at the same power rate. The fuel rods are the same length and the same diameter, but are manufactured from a mixture of solid cylindrical pellets containing 1.5 percent by weight enriched $U^{235}O_2$ and a hollow fuel pellet having a cylindrical opening 0.250 inch in diameter. These hollow fuel pellets have about 25 percent less fuel weight than the solid pellets, but contain an amount of enriched $UO_2$ which is equivalent to that contained in the solid pellets. Due to the decrease of fuel content in the cylindrical pellet, the effective enrichment is 2.0 percent. The distribution of the hollow fuel pellets along the fuel element is essentially that given by curve 98 in FIGURE 6. The peak to average neutron flux and power ratios are about 1.4 with an expected operating life of 5000 mw. d./t. Control rod programming is not required to flatten the power distribution and thus operation at power can be continued until all control rods are removed from the core. Power generation may be continued beyond this point with a gradually decreasing power output.

*Example IV*

As a further example, when the core of the above-mentioned 626 mw. (t.) reactor is substituted with fuel rods of the type shown in FIGURE 9 and in which the central fuel temperature no longer imposes the former limitation, even at the end of fuel life the thermal rating of this reactor is nearly 100 percent higher than with conventional fuel, being approximately 1100 mw. (t.).

It may be seen that the application of the improved fuel elements of the present invention in which the fissile atom content per unit length is substantially uniform and in which the fissile and fertile atom (nuclear fuel) content per unit length decreases with distance along the fuel element in the coolant flow direction, through the boiling region, has resulted in a substantial increase in the permissible power output from a given boiling reactor core and has simultaneously achieved a substantially increased fuel burnups not heretofore obtainable.

A particular embodiment of this invention has been described in considerable detail by way of illustration. It should be understood that various other modifications and adaptions thereof may be made by those skilled in this particular art without departing from the spirit and scope of this invention as set forth in the following claims.

I claim:
1. An improved nuclear fuel which comprises a plurality of axially aligned fuel pellets disposed to form an elongated nuclear fuel element, said plurality including solid fuel pellets and hollow fuel pellets having equivalent fissile atom contents, said solid and hollow fuel pellets being distributed along the length of said fuel element to provide a decrease in average total fissile and fertile atom content per unit length and a substantial increase in average enrichment of the fuel with distance along a substantial part of the length of said fuel element in one direction.

2. A fuel element according to claim 1 wherein said fuel element is provided with an external layer in which said fissile atom content is at least initially substantially entirely incorporated.

3. A fuel element according to claim 2 wherein said external layer constitutes between about 0.5 and about 20 percent by volume of said fuel element.

4. A fuel element according to claim 1 wherein said plurality of fuel pellets includes hollow fuel pellets all having substantially the same size central void opening.

5. A fuel element according to claim 1 wherein said plurality of fuel pellets includes a plurality of kinds of hollow fuel pellets each kind having a successively larger central void opening.

6. A fuel element according to claim 1 wherein said plurality of fuel pellets includes a plurality of kinds of hollow fuel pellets arranged in said fuel element to provide a tapering central void space along the longitudinal axis thereof.

7. An improved nuclear fuel which comprises a plurality of fuel pellets including solid and hollow fuel pellets all having substantially the same fissile atom content, and axially aligned with one another to form an elongated fuel element, said pellets being arranged so that the average number of solid pellets per unit length decreases substantially and the average number of hollow pellets per unit length correspondingly increases in a predetermined variation with distance in one direction along a substantial part of the said fuel element.

8. A fuel element according to claim 7 wherein the average number of hollow pellets per unit length increases faster with distance nearer one end of said fuel element than it does adjacent the other end of said fuel element to provide substantially normal cosine neutron flux and power distributions having a peak to average value of about 1.7.

9. A fuel element according to claim 7 wherein the predetermined variation of the average number of hollow fuel pellets per unit length of fuel element provides flattened pseudo square wave neutron flux and power distributions having a peak to average value between about 1.0 and about 1.7.

10. A fuel element according to claim 7 wherein the maximum dimension of each of said fuel pellets in any direction is less than about 25 percent of the neutron migration length.

11. In a boiling reactor which comprises a nuclear fuel-containing reactor core having a plurality of coolant flow paths extending therethrough, a volatile neutron moderating coolant within said flow paths cooperating with said core to provide a nuclear chain reacting assembly to liberate heat and at least partially vaporize said coolant, means for supplying liquid coolant to one end of said core, and means for removing vaporized coolant from the other end of said core, the improved nuclear reactor core which comprises a plurality of parallel elongated fuel elements each including solid fuel pellets and hollow fuel pellets having equivalent fissile atom contents, said solid and hollow fuel pellets being distributed along a substantial part of the length of each fuel element to provide a substantial decrease in the average total fissile and fertile atom content per unit length and a substantial increase in the average enrichment of the fuel in the coolant flow direction to overcome at least partly the abnormal neutron flux and power distributions ordinarily caused by boiling the coolant.

12. In a boiling reactor which comprises a nuclear fuel-containing reactor core having a plurality of coolant flow paths extending therethrough, a volatile neutron-moderating coolant within said flow paths cooperating with said core to provide a nuclear chain reacting assembly to liberate heat and at least partially vaporize said coolant, means for supplying liquid coolant to one end of said core, and means for removing vaporized coolant from the other end of said core, the improved nuclear reactor core which comprises a plurality of parallel elongated nuclear fuel elements each containing a plurality of individual fuel pellets including solid and hollow fuel pellets all having substantially the same fissile atom content and axially aligned with one another, said pellets being arranged in each fuel element so that the average number of solid pellets per unit length decreases substantially and the average number of hollow pellets per unit length correspondingly increases throughout a substantial part of the length of said fuel element in a predetermined variation with distance in the coolant flow direction along said fuel element.

13. In a boiling reactor which comprises a nuclear fuel-containing reactor core having a plurality of coolant flow paths extending therethrough, a volatile neutron-moderating coolant within said flow paths cooperating with said core to provide a nuclear chain reacting assembly to liberate heat and at least partially vaporize said coolant, means for supplying liquid coolant to one end of said core, and means for removing vaporized coolant from the other end of said core, the improved nuclear reactor core which comprises a plurality of parallel elongated nuclear fuel elements each containing a plurality of individual fuel pellets including solid and hollow fuel pellets all having substantially the same fissile atom content and axially aligned with one another, said pellets being arranged in each fuel element so that, throughout a substantial part of the length thereof, the average number of solid pellets per unit length decreases substantially and the average number of hollow pellets per unit length correspondingly increases faster with distance in the coolant flow direction along said fuel element nearer the coolant inlet end of said core than it does near the coolant outlet end of said core to provide substantially normal cosine neutron flux and power distributions having a peak to average value of about 1.7 in the presence of the boiling coolant.

14. In a boiling reactor which comprises a nuclear fuel-containing reactor core having a plurality of coolant flow paths extending therethrough, a volatile neutron-moderating coolant within said flow paths cooperating with said core to provide a nuclear chain reacting assembly to liberate heat and at least partially vaporize said coolant, means for supplying liquid coolant to one end of said core, and means for removing vaporized coolant from the other end of said core, the improved nuclear reactor core which comprises a plurality of parallel elongated nuclear fuel elements each containing a plurality of individual fuel pellets including solid and hollow fuel pellets all having substantially the same fissile atom content and axially aligned with one another, said pellets being arranged in each fuel element so that, throughout a substantial part of the length thereof, the average number of solid pellets per unit length decreases substantially and the average number of hollow fuel pellets per unit length correspondingly increases in a predetermined variation with distance in the coolant flow direction along said fuel element to provide flattened pseudo square wave neutron flux and power distributions axially through said core having peak to average values between about 1.0 and about 1.7 in the presence of the boiling coolant.

References Cited in the file of this patent

UNITED STATES PATENTS

| | | |
|---|---|---|
| 2,774,730 | Young | Dec. 18, 1956 |
| 2,861,033 | Treshow | Nov. 18, 1958 |

FOREIGN PATENTS

| | | |
|---|---|---|
| 1,021,515 | Germany | Dec. 27, 1957 |

OTHER REFERENCES

AECD-3715, Feb. 1, 1954, p. 11.

Harrer et al.: Proceedings of the International Conference on the Peaceful Uses of Atomic Energy, 1955, vol. 3, pp. 250–262.

ANL-5371, Reactor Engineering Division Quarterly Report for Oct. 1, 1954, through Dec. 31, 1954, January 1955, page 48.

GER-1301, A Design Description of the Dresden Nuclear Power Station, November 1956, pages 12–14.

CRL-47, November 1957, in particular the abstract before page 1.